US00RE43831E

(19) United States
(12) Reissued Patent
Herrmann et al.

(10) Patent Number: US RE43,831 E
(45) Date of Reissued Patent: Nov. 27, 2012

(54) METHOD AND APPARATUS FOR MAKING INTERNAL CONNECTIONS WITHIN A BATTERY PACK

(75) Inventors: Amy Terese Herrmann, Suwanee, GA (US); Steven Fischl, Lawrenceville, GA (US); Christian Schneider, Flowery Branch, GA (US); Robert Leon, Harvard, IL (US)

(73) Assignee: Motorola Mobility LLC, Libertyville, IL (US)

(21) Appl. No.: 10/243,519

(22) Filed: Sep. 16, 2002
(Under 37 CFR 1.47)

Related U.S. Patent Documents

Reissue of:
(64) Patent No.: 6,165,639
Issued: Dec. 26, 2000
Appl. No.: 09/164,987
Filed: Sep. 30, 1998

(51) Int. Cl.
*H01M 2/20* (2006.01)

(52) U.S. Cl. ..... 429/99; 429/127; 429/178
(58) Field of Classification Search ..... 429/121–123, 429/153, 158, 163, 178, 223, 96–100, 127, 429/225
See application file for complete search history.

(56) References Cited

U.S. PATENT DOCUMENTS 5,857,148 A * 1/1999 Weisshappel et al. ..... 455/575.3
* cited by examiner

*Primary Examiner* — Jennifer Michener
*Assistant Examiner* — Monique Wills

(57) ABSTRACT

A battery pack which provides for the making of internal connections within the battery pack includes a plurality of apertures (206) having battery pack contacts (204) in register with the apertures (206) and are located on top of corresponding metal tabs (104). The invention allows for a welding tip to be passed through the aperture (206) in order to weld the battery pack contacts (204) to their corresponding metal tabs (104). Once welded the apertures (206) can be sealed by preferably placing a battery label over the apertures (206).

17 Claims, 5 Drawing Sheets

NEW

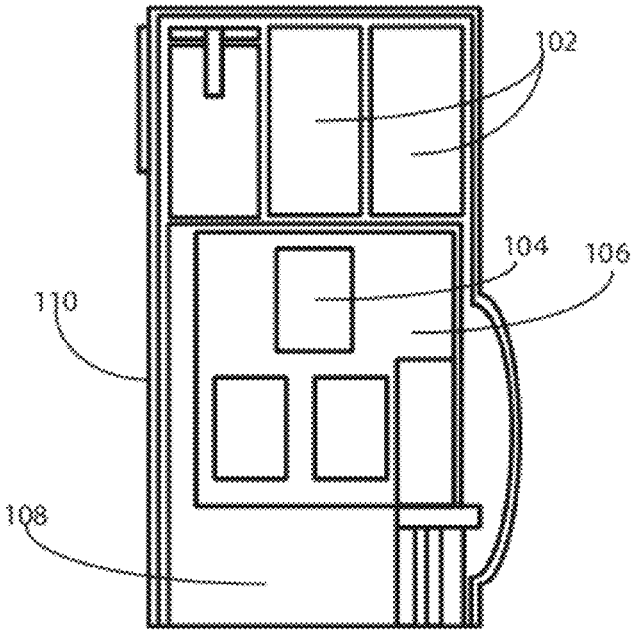
FIG. 5
NEW
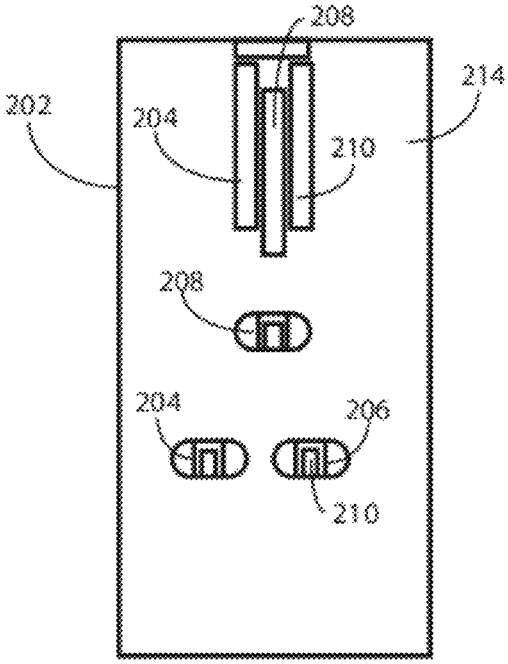
FIG. 6
NEW

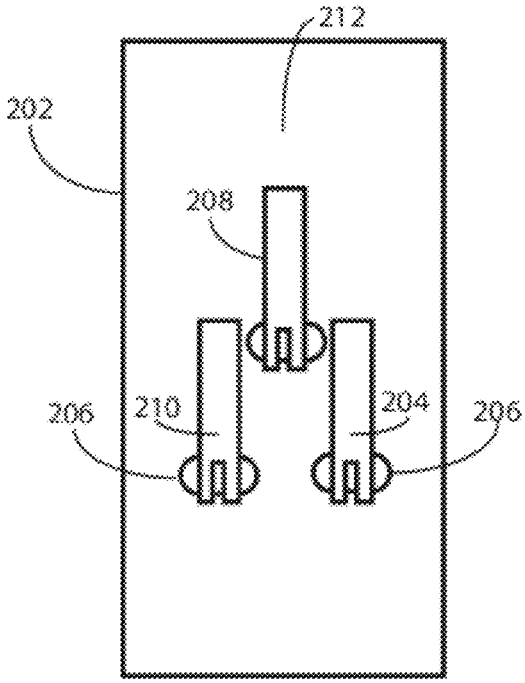
FIG. 7
NEW
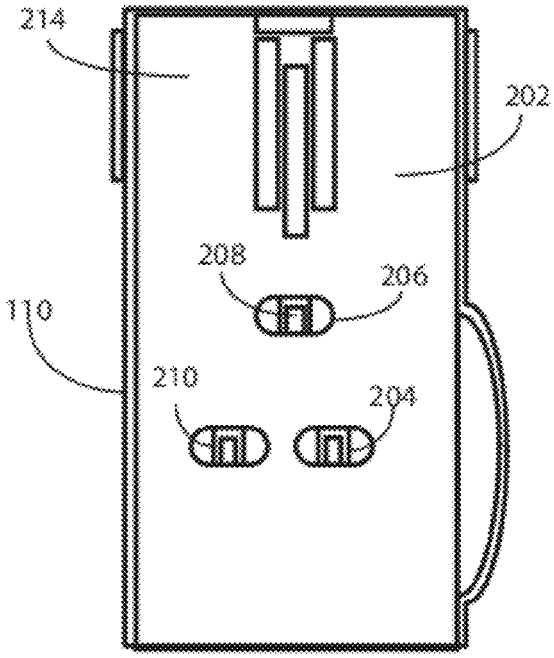
FIG. 8
NEW

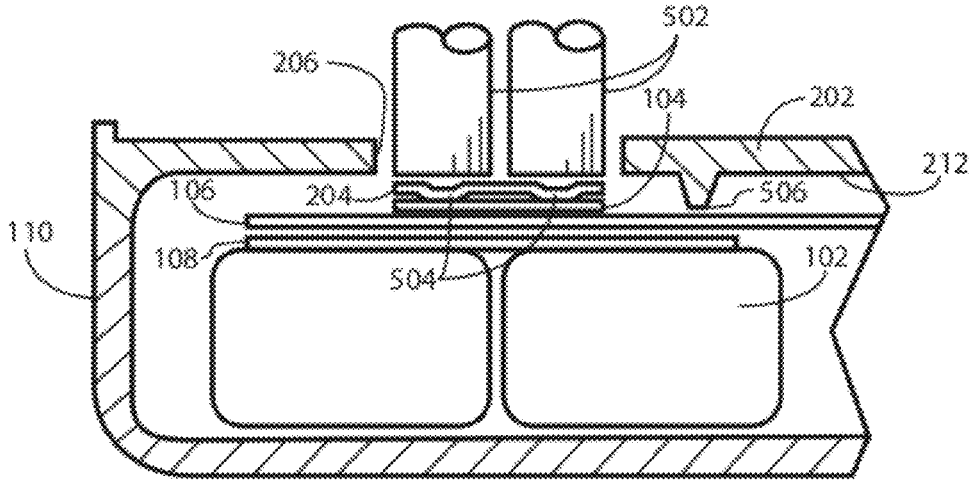
FIG. 9
NEW
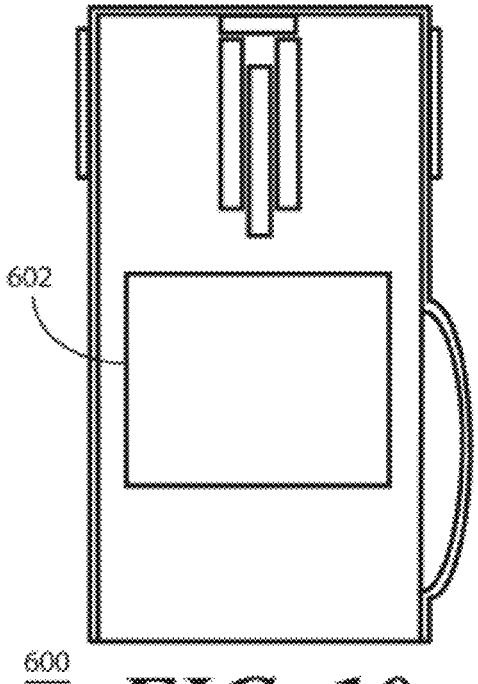
FIG. 10
NEW

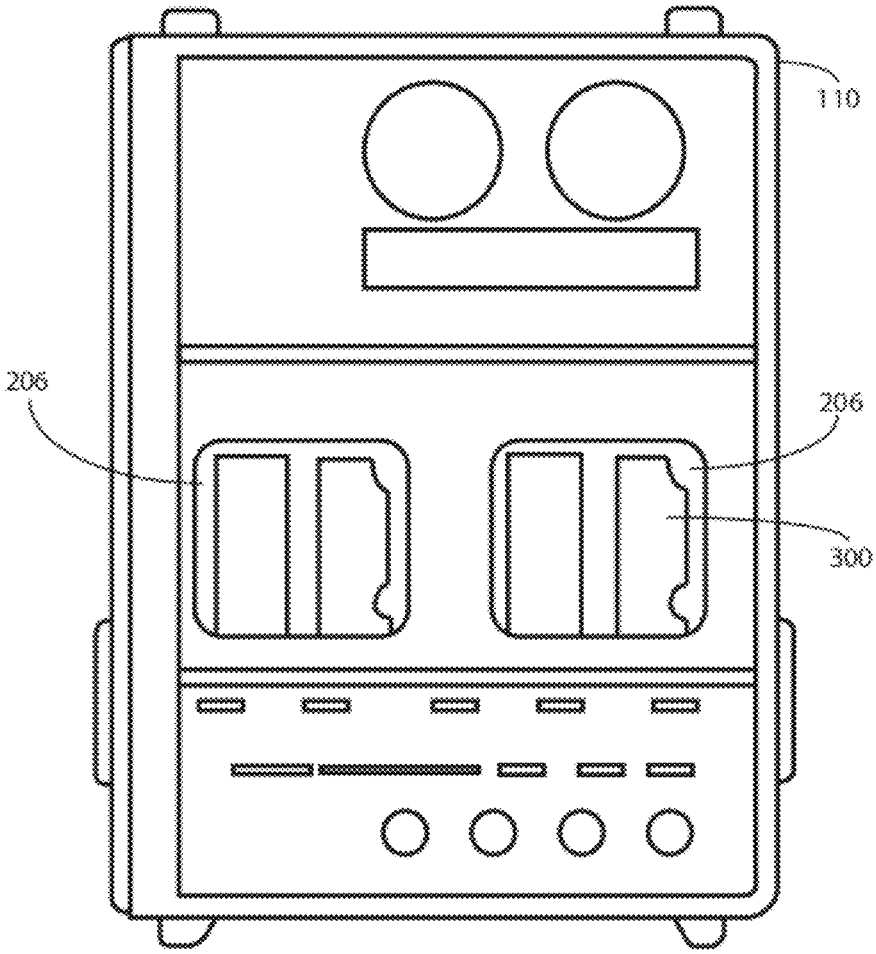
*FIG. 11*
NEW

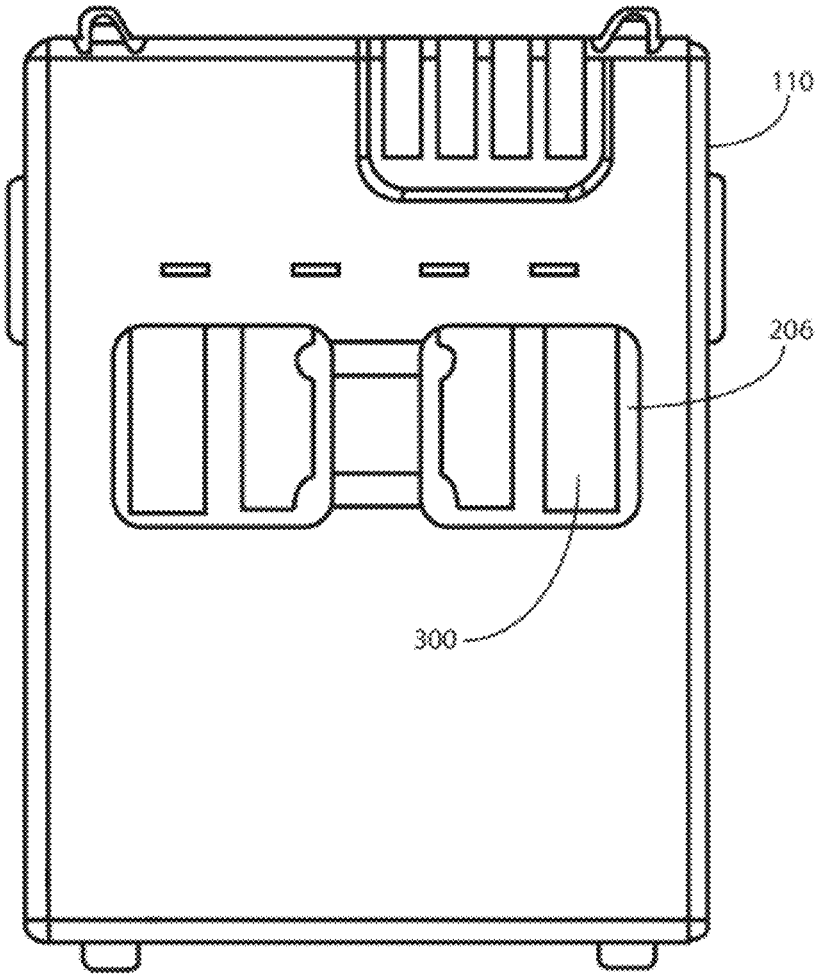
*FIG. 12*
NEW

METHOD AND APPARATUS FOR MAKING INTERNAL CONNECTIONS WITHIN A BATTERY PACK

Matter enclosed in heavy brackets [ ] appears in the original patent but forms no part of this reissue specification; matter printed in italics indicates the additions made by reissue.

TECHNICAL FIELD

This invention relates in general to battery packs and more specifically to a method and apparatus for making internal connections within a closed battery pack.

BACKGROUND

Battery packs typically require the electrical interconnection of the battery cell(s) found within the battery pack to battery pack contacts or terminals. The battery pack contacts allow for the interconnection of the battery pack to a battery powered device which is to operate using the battery pack.

In the manufacturing of some present-day battery packs, the electrical interconnection between the battery cell(s) and the battery pack contacts is performed by interconnecting a flexible circuit substrate ("flex circuit") to the battery cell(s) and then welding the battery pack contacts to tabs located on the flex circuit. This welding step is typically performed in a location having limited access given that the battery contacts are attached to the cover of the battery pack, while the tabs are located in the battery pack housing which the cover mates to. Welds such as these which are performed under limited access conditions produce higher weld defects. Also, this limited access to the weld spots may result in the twisting and/or pre-stressing of the flex circuit which interconnects the battery cells, tab, or other components of the battery pack. A need thus exists for a method and apparatus for making connections within a battery pack which reduces the problems mentioned above.

BRIEF DESCRIPTION OF THE DRAWINGS

FIG. [1] *5* is a view of a battery pack without the cover in accordance with the invention.

FIG. [2] *6* is a exterior view of a battery pack cover in accordance with the invention.

FIG. [3] *7* is an interior view of the battery pack cover shown in FIG. [2] *6*.

FIG. [4] *8* shows the battery pack cover shown in FIG. [2] *6* attached to the battery pack of FIG. [1] *5*.

FIG. [5] *9* shows a cross-sectional view of a battery pack in the process of being welded in accordance with the invention.

FIG. [6] *10* shows a battery pack with label in accordance with the invention.

FIG. [7] *11* is an interior view of the second embodiment of the battery pack cover of the present invention.

FIG. [8] *12* is an exterior view of the second embodiment of the battery pack cover of the present invention.

DETAILED DESCRIPTION OF THE PREFERRED EMBODIMENT

Referring now to FIG. [1] *5* there is shown a battery pack without cover in accordance with the invention. Battery housing member 110 can be formed from a number of materials such as plastic, etc. Located within the battery housing member 110 is a plurality of rechargeable battery cells 102, in the preferred embodiment, battery cells 102 are flat prismatic cells. The plurality of battery cells 102 are interconnected together using a flex circuit 106 which includes electrical traces (runners) which interconnect all of the battery cells 102 together. An insulative material 108 insulates the flex circuit 106 from the battery cells 102. A set of metal tabs 104 which are formed on or attached to flex circuit 106 and are electrically interconnected to the battery cells are carried by flex circuit 106. Tabs 104 in the preferred embodiment are approximately 1.16 centimeter (0.40 inch) long and 0.660 centimeter (0.26 inch) wide and are formed from nickel or nickel alloy. The tabs 104 are attached to the flex circuit 106 using anyone of a number of well known attachment techniques. In the preferred embodiment three tabs 104 which are electrically isolated from each other are provided. One tab is electrically coupled to the positive terminal of the battery pack, a second tab is electrically coupled to the negative terminal of the battery pack and a third tab is included but is currently not being used, but is available for future expansion purposes.

In one embodiment of the invention, the tab is made thicker than its usual four tabs on flexible circuits, that is, instead of being $^{500}/_{1000}$ of an inch thick, the tab may be made $^{12}/_{1000}$'s of an inch thick. This increase in thickness reduces the gap between the battery tab and the insert molded battery contact, promoting a better weld joint.

In FIG. [2] *6*, the exterior surface 214 of a cover 202 for use with battery pack 110 is shown. The cover 202 includes a set of battery pack contacts 204 which are preferably partially molded into cover 202. The exterior portion of battery contacts 204, 208, and 210 provide interconnection to a battery operated device which uses the battery pack in order to operate. Battery pack contacts 204, 208, and 210 are electrically insulated from each other by spacing them a predetermined distance from each other. A set of access ports or apertures 206 which will be discussed later in detail, are also included as part of cover 202. As can be seen, the ends of each of the battery pack contacts 204, 208, and 210 extend to the apertures and can be seen in register with the apertures 206.

In FIG. [3] *7*, the interior surface 212 of battery pack cover 202 is shown. As can be seen in FIG. [3] *7*, only the lower portion of each of the battery pack contacts 204, 208, and 210 extends from the interior surface 212 of the battery cover 202. Each of the lower ends of battery pack contacts 204, 208, and 210 extend such that they are presented in front of apertures 206 (in alignment with apertures 206).

In FIG. [4] *8*, the battery cover 202 is shown attached to the battery pack housing member 202. The battery cover 202 is preferably ultrasonically welded to battery pack housing member 202 around its perimeter. As can be seen in FIG. [4] *8*, the end sections of battery pack contacts 204, 208, and 210 are preferably split with each having protrusions (bumped-out) for providing more consistent welding of the contacts 204, 208, and 210 to their corresponding tabs 104.

Referring now to FIG. [5] *9*, a cross-sectional view of a portion of the battery pack being welded by welding equipment electrodes 502 is shown. The preferable method of welding battery contacts 204, 208, and 210 to their corresponding tabs 104 is by parallel-gap resistance welding. Each of the welding electrodes 502 make contact to one of the split ends of the battery contact 204. The bumped-in or weld protrusions at each of the split ends provide for better welding of the battery contact 204 to tab 104. Insulator 108 protects the battery cells 102 from electrical shorts. Although the preferred embodiment welds the battery pack contacts 204, 208, and 210 to tabs 104, other mechanical attachment techniques can be used to attach the battery pack contacts to their corresponding tabs 104, as for example, by soldering, using conductive adhesives, ultrasonically welding, etc.

The flexible circuit 106 can be held in place against battery cells 102 so that tab 104 does not move about and remains in register with access port 206 by holding the flex circuit 106 down by using tape or other known attachment methods under the flex circuit 106. In FIG. [5] *9* a guide member 506 which is part of cover 202 can be used to maintain flex circuit 106 in place and therefore maintain tabs 104 in register with access port 206 and battery contact 204.

The end portion of battery contact 204, 208, and 210 is preferably split as mentioned above and also each of the split ends has a bumped-out portion 504 which provides for improved welding of the battery contact 204 to the tab 104.

Once all of the battery contacts 204, 208, and 210 are welded to tabs 104, the access ports 206 found in the battery cover can be sealed to prevent dust, water, etc. from entering the battery pack. In the preferred embodiment a battery label big enough to cover all three access ports 206 is attached to the battery cover 202 The label is attached using any of a number of adhesives and techniques known in the industry. Since the label includes information that is typically provided (e.g., battery model number, etc.) no added expense is incurred in sealing access ports 206. Access ports 206 can however be sealed using any one of a number of other techniques, such as by placing epoxy over each of the access ports 206.

In FIG. [6] *10*, a battery pack 600 is shown having its access holes covered with label 602. Label 602 can be an adhesive label or can be attached using adhesives to the battery pack. Once label 602 is attached to the battery pack, the battery pack is completely sealed and can even be submersed in water.

FIG. [7] *11* shows an interior view of a second embodiment of the battery pack (110) of the present invention. Here, battery contacts 300 are flat metal strips insert molded into the plastic of battery pack cover (110). Battery pack contacts 300 are cantilevered, that is, they are fixed at one end to the battery pack cover (110), like a diving board. This permits a welding electrode (not shown) to push contact 300 down onto battery tabs (104) permitting a more reliable welding operation. The fact that the battery contacts 300 are insert molded means there is less likelihood of a short circuit between exposed metal electrically connected to the tabs 204 and the negative and positive terminals of a battery cell which will be seated in the battery pack cover (110). FIG. [8] *12* shows an exterior view of the battery pack cover (110) of the present invention showing access ports (206) and welded-in battery contacts 300.

The present invention also provides for easy repair of defective welds. A defective weld between a molded-in battery contact and a battery tab may be re-welded very easily. This reduces the costs of reworking effective parts.

To recap, access ports 206 allow for the internal resistance welding of the molded-in battery contacts 204 to the surface mounted contact tabs 104 while the battery pack cover is already attached to the battery housing 110. Since tabs 104 are sized large enough that they compensate for any shifting of the battery cells 102 and flex circuit 106 no tolerance problems are encountered.

In summary, the present invention provides for a cost effective method of welding the battery tabs 104 to the battery pack contacts 204, 208, and 210 with the battery pack cover 202 already attached to the battery housing. This prevents the problems encountered with the prior art method of trying to weld the battery contacts that are attached to the cover to tabs located in the battery housing. The present invention substantially reduces the chances of pre-stressing parts during the welding operation. It also reduces the chances of bad welds from occurring, as compared to the higher number of bad welds which occur when limited access is available to perform the weld operation.

What is claimed is:

1. A method for making internal connections within a battery pack, comprising the steps of:

providing an access port in the battery pack;

providing a battery contact in register with the access port;

providing a flat tab having a substantially rectangular cross section internal to the battery pack and in substantial alignment with the battery contact; and welding the battery contact to the tab through the access port.

2. A method as defined in claim 1, wherein the welding step comprises parallel resistance welding the battery to the contact tab.

3. A method as defined in claim 2, further comprising the step of:

sealing the access port after the battery contact has been welded to the tab.

4. A method as defined in claim 3, wherein the sealing step comprises attaching a label to the battery pack which covers the access port.

5. A method as defined in claim 2, wherein the step of providing a battery pack in register with the access ports comprises the step of:

molding the battery contact to the battery back such that a portion of the battery contact is presented at the access port.

6. A method as defined in claim 2, wherein the step of providing a tab comprises providing a tab which is electrically coupled to a battery cell which is located within the battery pack.

7. A battery pack, comprising:

a battery housing;

a battery cell located within the housing;

a flat tab having a substantially rectangular cross section electrically coupled by welding to the battery cell;

a battery pack cover attached to the battery housing such that the battery cell is enclosed within the battery housing and battery pack cover, where the battery pack cover includes:

an access port; and a battery pack contact attached to the cover and having a portion of the battery contact presented at the access port such that the battery contact and tab are aligned with each other and with the access port.

8. A battery pack as defined in claim 7, wherein the access port is an aperture which is large enough to allow for attachment of the battery pack contact to the tab through the aperture.

9. A battery pack as defined in claim 7, wherein the tab is attached to a flexible circuit which provides electrical interconnection between the tab and the battery cell.

10. A battery pack as defined in claim 7, wherein the battery pack cover is ultrasonically welded to the battery housing.

11. A battery pack as defined in claim 7, wherein a portion of the battery pack contact is partially molded into the battery cover.

12. A battery pack as defined in claim 7, wherein the battery contact has a split end.

13. A battery pack as defined in claim 7, wherein the battery contact is welded to the tab.

14. A battery pack as defined in claim 7, wherein the tab is attached to the battery cell.

15. A battery pack as defined in claim 9, wherein the cover includes an alignment guide and the flexible circuit includes an aperture for receiving the alignment guide.

16. A battery pack as defined in claim 12, wherein the split end has a bumped out portion that mates with the tab.

17. The battery pack as defined in claim 11, wherein the battery pack contact is cantilevered to either contact.

* * * * *